(12) United States Patent
Hohensee (10) Patent No.: US 8,683,483 B2
(45) Date of Patent: Mar. 25, 2014

(54) RESOURCE UTILIZATION MONITOR

(75) Inventor: Paul H. Hohensee, Nashua, NH (US)

(73) Assignee: Oracle America, Inc., Redwood City, CA (US)

(*) Notice: Subject to any disclaimer, the term of this patent is extended or adjusted under 35 U.S.C. 154(b) by 1411 days.

(21) Appl. No.: 12/054,491

(22) Filed: Mar. 25, 2008

(65) Prior Publication Data

US 2009/0249352 A1    Oct. 1, 2009

(51) Int. Cl.
G06F 9/46    (2006.01)

(52) U.S. Cl.
USPC .......................................... 718/105; 718/104

(58) Field of Classification Search
None
See application file for complete search history.

(56) References Cited

U.S. PATENT DOCUMENTS

| | | | | |
|---|---|---|---|---|
| 3,626,383 A * | 12/1971 | Oswald et al. | | 379/9 |
| 4,677,544 A * | 6/1987 | Kinoshita | | 713/600 |
| 5,890,008 A * | 3/1999 | Panwar et al. | | 712/15 |
| 6,292,822 B1 | 9/2001 | Hardwick | | |
| 6,662,252 B1 | 12/2003 | Marshall et al. | | 710/200 |
| 7,028,298 B1 * | 4/2006 | Foote | | 718/104 |
| 7,159,220 B2 * | 1/2007 | Buch | | 718/104 |
| 7,240,117 B2 * | 7/2007 | Zatloukal et al. | | 709/229 |
| 7,461,215 B2 | 12/2008 | Hass | | |
| 7,461,376 B2 | 12/2008 | Geye et al. | | |
| 7,467,243 B2 | 12/2008 | Rashid et al. | | |
| 7,614,056 B1 * | 11/2009 | Saxe et al. | | 718/105 |
| 7,707,366 B2 * | 4/2010 | Tagawa | | 711/154 |
| 7,831,708 B2 * | 11/2010 | Anstey et al. | | 709/224 |
| 7,831,732 B1 * | 11/2010 | Zilist et al. | | 709/237 |
| 2003/0005252 A1 * | 1/2003 | Wilson et al. | | 711/167 |
| 2005/0086439 A1 * | 4/2005 | Kaczynski | | 711/151 |
| 2005/0166206 A1 * | 7/2005 | Parson | | 718/104 |
| 2005/0229179 A1 * | 10/2005 | Ballantyne | | 718/100 |
| 2006/0095908 A1 * | 5/2006 | Norton et al. | | 718/100 |
| 2006/0136916 A1 * | 6/2006 | Rowland et al. | | 718/100 |
| 2006/0179196 A1 * | 8/2006 | Gray | | 710/240 |
| 2007/0162715 A1 * | 7/2007 | Tagawa | | 711/158 |
| 2007/0288728 A1 * | 12/2007 | Tene et al. | | 712/227 |
| 2007/0300227 A1 * | 12/2007 | Mall et al. | | 718/102 |
| 2008/0104610 A1 * | 5/2008 | Norton et al. | | 718/108 |
| 2008/0184233 A1 * | 7/2008 | Norton et al. | | 718/100 |
| 2008/0250415 A1 * | 10/2008 | Illikkal et al. | | 718/103 |
| 2008/0271043 A1 * | 10/2008 | Kim et al. | | 718/108 |
| 2009/0049446 A1 * | 2/2009 | Merten et al. | | 718/103 |
| 2009/0070774 A1 * | 3/2009 | Raikin et al. | | 718/108 |

* cited by examiner

*Primary Examiner* — Emerson Puente
*Assistant Examiner* — Hiren Patel
(74) *Attorney, Agent, or Firm* — Meyertons Hood Kivlin Kowert & Goetzel, P.C.; Jeffrey C. Hood; Joel L. Stevens (57) ABSTRACT

Load-balancing threads among a plurality of processing units. The method may include a first processing unit executing a plurality of software threads using a respective plurality of hardware strands. The plurality of hardware strands may share at least one hardware resource within the first processing unit. The method may further include monitoring the at least one hardware resource, wherein, for each respective hardware strand. Monitoring may include, for each respective hardware resource of the at least one hardware resource: maintaining information regarding the respective hardware strand requesting to use the respective hardware resource but failing to do so because the respective hardware resource is in use, comparing the information to a threshold, and generating an interrupt if the information exceeds the threshold. One or more load-balancing operations may be performed in response to the interrupt.

9 Claims, 6 Drawing Sheets

RESOURCE UTILIZATION MONITOR

FIELD OF THE INVENTION

The present invention relates to the field of resource monitoring, and more particularly to a system and method for load-balancing threads among a plurality of processing units.

DESCRIPTION OF RELATED ART

Many conventional processor implementations attempt to increase performance by increasing the number of instructions the processor can concurrently execute from a single execution thread. For example, typical superscalar processor architectures include multiple execution units, such as load/store units, arithmetic logic units, branch processing units, etc. If such a superscalar processor can identify sufficient instruction-level parallelism within a given execution thread, it may correspondingly improve performance by executing those instructions in parallel in the multiple execution units.

Accordingly, processing units which include a plurality of strands (or hardware threads) each capable of executing software threads have been developed. Such processing units are sometimes referred to as simultaneous multithreaded (SMT) processors. However, the strands each compete with each other for hardware resources within the processing units. In some cases, individual hardware resources may become saturated thereby decreasing performance for various software threads being executed by strands of the processing units. Accordingly, improvements in load balancing in processing units are desired.

SUMMARY

Various embodiments are presented of a method for load-balancing threads among a plurality of processing units.

A plurality of software threads may be executed using a plurality of respective hardware strands of a first processing unit. The first processing unit may be a processor or a processing core of a processor, among other possibilities. As also indicated above, the plurality of hardware strands may share at least one hardware resource within the first processing unit. The at least one hardware resource may include one or more memory elements, one or more integer units, one or more floating point units, and/or one or more program execution units, e.g., of the processing unit.

In some embodiments, the first processing unit may be comprised in a computer system or other electronic device which includes a plurality of processing units (e.g., a plurality of processors, one or more processors which include a plurality of cores, etc.).

The at least one hardware resource being shared among the plurality of strands may be monitored. Monitoring the at least one hardware resource may include maintaining information regarding the respective hardware strand; comparing the information to a threshold; and generating an interrupt if the information exceeds the threshold. Monitoring the at least one hardware resource may include monitoring each respective hardware resource of the at least one hardware resource for each strand. In other words, one or more hardware resources may each be monitored according to each hardware strand. However, alternate embodiments are envisioned where the hardware resources are monitored individually without respect to hardware strands, as desired.

More specifically, maintaining information may include maintaining information regarding the respective hardware strand requesting to use the respective hardware resource but failing to do so because the respective hardware resource is in use. In other words, the information may indicate how many times the hardware resource was in use when the respective hardware strand required use of the hardware resource.

Maintaining the information (or monitoring the hardware resource) may be performed by one or more hardware elements or circuitry in the computer system/electronic device. In some embodiments, the hardware elements may be within the first processing unit, as desired.

In some embodiments, maintaining the information may be performed over a first period of time. The time period may be measured in a number of clock cycles and/or a measure of seconds, among other units of time. In one embodiment, maintaining the information may include, during the first period of time, determining that a respective hardware strand has requested use of the respective hardware resource and adjusting a value in response to the determination.

In some embodiments, maintaining the information may be performed over a first number of clock cycles and may include storing the first number in a register or other memory element. Additionally, a second number may be adjusted each clock cycle during which the respective hardware strand attempts or desires to use the respective hardware resource but cannot because the hardware resource is in use, and decrementing the first number in the register or memory element each clock cycle.

As indicated above, the information may be compared to a threshold. In some embodiments, the threshold may simply be a specific number of times the hardware resource was busy when requested (e.g., by the strand). As a simple example, a memory resource may have been in use 10 times (e.g., as stored in a counter) over the first time period (e.g., 100 clock cycles). The threshold value may be 5. Correspondingly, in this example, the memory resource may have been saturated during the 100 clock cycles since it exceeded the threshold.

As indicated above, an interrupt may be generated if the information exceeds the threshold. As indicated above, the interrupt may indicate that the respective hardware resource is currently saturated, and one or more actions may need to be performed.

One or more load-balancing operations may be performed in response to the interrupt. In some embodiments, the load-balancing operations may be performed by an operating system (or other operating software) executing on the computer system or electronic device comprising the plurality of processing units. However, other embodiments are envisioned where hardware may perform some or all of the load-balancing operations.

The one or more load-balancing operations may include moving a software thread to a different one of the processing units (e.g., one that is unsaturated in general, or unsaturated with respect to the specific hardware resource). In one embodiment, this may be done simply by moving one or more software threads that are executing on strands of the first processing unit to a different processing unit of the system (e.g., a computing system comprising the first processing unit).

The method may further include (or the load balancing operations may include) modifying one or more parameters of maintaining the information. For example, the specific hardware resource being monitored may be modified, the length of time (e.g., the cycles or seconds, among other units) may be modified, the threshold value may be modified, and/or other parameters may be modified. In some embodiments, such modifications may be performed dynamically during operation or statically, as desired. The modifications may be performed by software (e.g., operating system software executing on the computer system comprising the plurality of processing units) or by hardware, as desired. After modification, the system may operate according to the methods described above using the modified parameters.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference:

The following references are hereby incorporated by reference in their entirety as though fully and completely set forth herein:

U.S. Publication No. 2006/0004995, titled "Apparatus and Method for Fine-Grained Multithreading in a Multipipelined Processor Core," filed on Jun. 30, 2004 and published on Jan. 5, 2006.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processing unit that executes instructions from a memory medium.

Processing Unit—any of various hardware resources which are capable of executing instructions, e.g., received from a memory medium, including processors, processor cores, etc.

Overview of Multithreaded Processor Architecture

Figure 1:
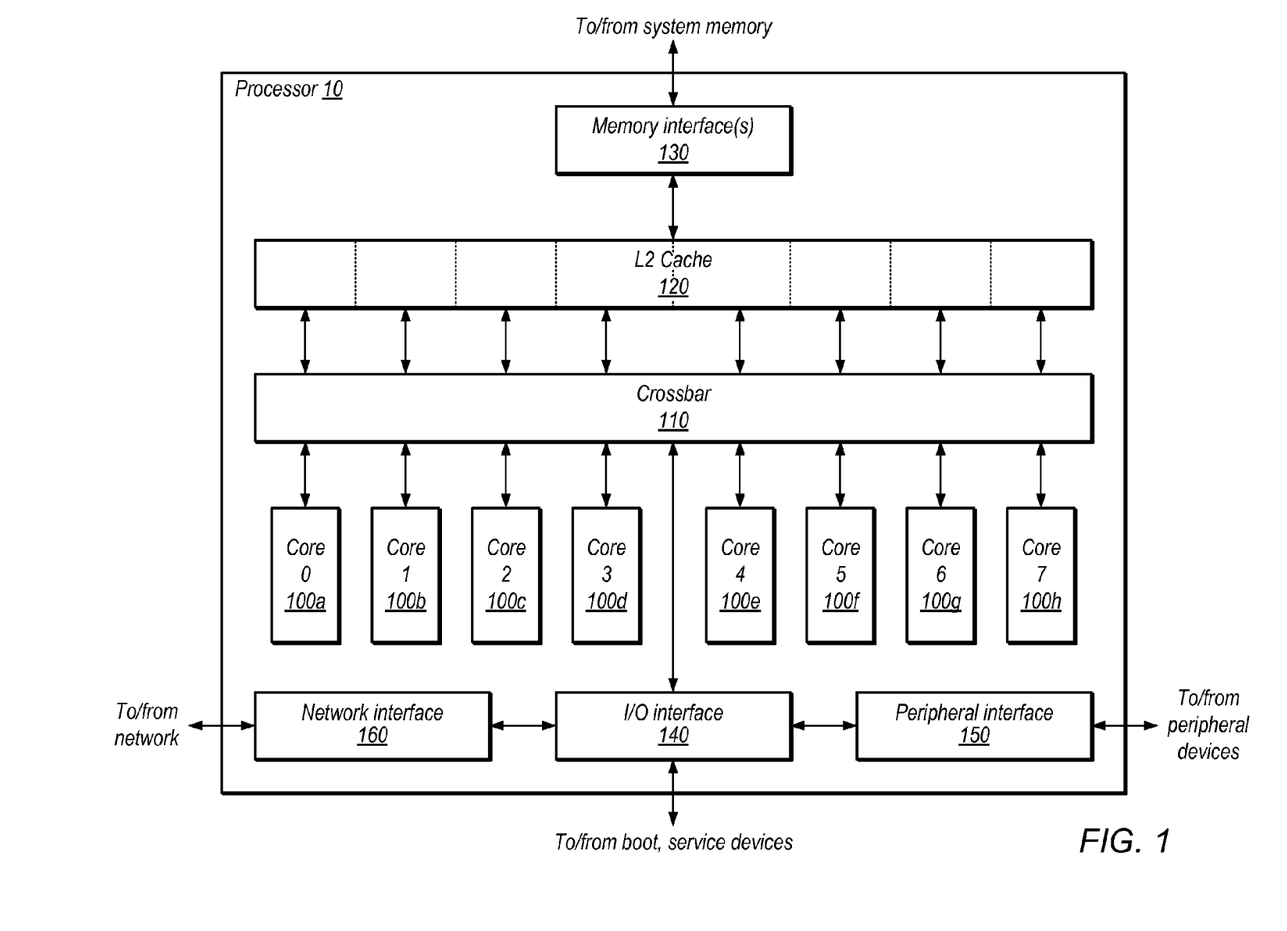
FIG. 1 is a block diagram illustrating one embodiment of a multithreaded processor.

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. I/O interface 140, peripheral interface 150 and network interface 160 may respectively couple processor 10 to boot and/or service devices, peripheral devices, and a network. In some embodiments, processor 10 may be implemented on a single integrated circuit.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments, each of cores 100 may be configured to execute multiple threads concurrently, where a given thread may include a set of instructions that may execute independently of instructions from another thread. (For example, an individual software process, such as an application, may comprise one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Each hardware thread (that is the hardware capable of executing a software thread) may be referred to as a strand herein. For example, a strand may execute a single software thread at a time, but may be able to execute a plurality of software threads in a time period (e.g., by alternation or time slicing).

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. For example, as shown, the processor 10 may comprise an I/O interface 140, a peripheral interface 150 and/or a network interface 160. The I/O interface 140 may be configured to provide a central interface for such sources (e.g., DMA logic or external boot and/or service devices) to exchange data with cores 100 and/or L2 cache 120 via crossbar 110. Peripheral interface 150 may be configured to coordinate data transfer between processor 10 and one or more peripheral devices. Network interface 160 may be configured to coordinate data transfer between processor 10 and one or more devices (e.g., other computer systems) coupled to processor 10 via a network.

Overview of Fine-Grained Multithreading Processor Core

Figure 2:
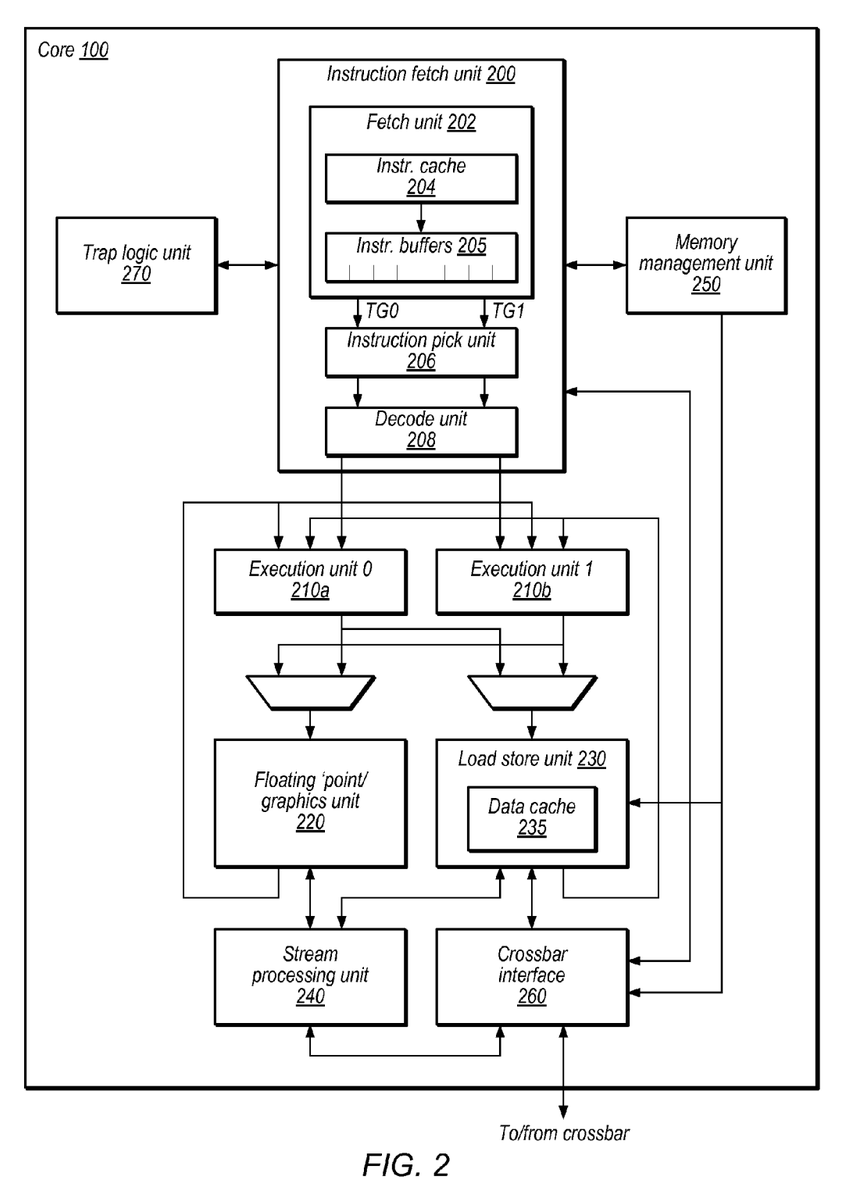
FIG. 2 is a block diagram illustrating one embodiment of a processor core configured to perform fine-grained multithreading.

As mentioned above, in one embodiment each of cores 100 may be configured for multithreaded execution using a plurality of strands. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently using respective strands. For example, in a pipelined embodiment of core 100 employing fine-grained multithreading, instructions from different threads may occupy adjacent pipeline stages, such that instructions from several threads may be in various stages of execution during a given core processing cycle. Further, in some embodiments of core 100, multiple execution pipelines may be configured to operate concurrently (i.e., core 100 may be "multipipelined").

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1. It is noted that any unit that participates in the execution of instructions (e.g., EXUs 210, FGU 220, LSU 230 and/or SPU 240) may be generically referred to as an execution unit. Thus, the plurality of strands of the core 100 may be configured to share the above referenced hardware resources (among other possible resources) during execution. For more information on one embodiment of the core 100, please see U.S. Patent Application Publication No. 2006/0004995, incorporated by reference above.

Figure 3:
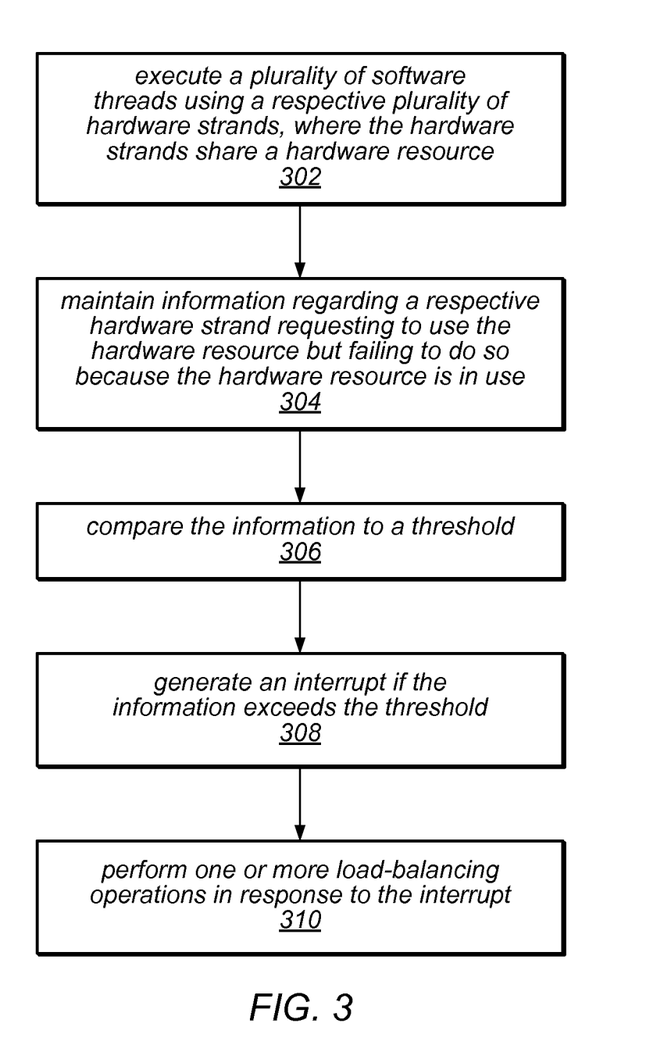
FIG. 3 is a flowchart diagram illustrating an exemplary method for load-balancing threads among a plurality of processing units.

FIG. 3—Flowchart

FIG. 3 illustrates a method for load-balancing threads among a plurality of processing units. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, the method may operate as follows.

In 302, a plurality of software threads may be executed using a plurality of respective hardware strands of a first processing unit. As indicated above, the first processing unit may be a processor or a processing core of a processor, among other possibilities. As also indicated above, the plurality of hardware strands may share at least one hardware resource within the first processing unit; however, it may be possible to share hardware resources outside of the first processing unit, as desired. The at least one hardware resource may include one or more memory elements, one or more integer units, one or more floating point units, and/or one or more program execution units, e.g., of the processing unit.

In some embodiments, the first processing unit may be comprised in a computer system or other electronic device which includes a plurality of processing units (e.g., a plurality of processors, one or more processors which include a plurality of cores, etc.).

The at least one hardware resource being shared among the plurality of strands may be monitored. Monitoring the at least one hardware resource may include, in 304, maintaining information regarding the respective hardware strand; in 306, comparing the information to a threshold; and in 308, generating an interrupt if the information exceeds the threshold. Monitoring the at least one hardware resource may include monitoring each respective hardware resource of the at least one hardware resource for each strand. In other words, one or more hardware resources may each be monitored according to each hardware strand. However, alternate embodiments are envisioned where the hardware resources are monitored individually without respect to hardware strands, as desired.

More specifically, in 304, maintaining information may include maintaining information regarding the respective hardware strand requesting to use the respective hardware resource but failing to do so because the respective hardware resource is in use. In other words, the information may indicate how many times the hardware resource was in use when the respective hardware strand required use of the hardware resource.

Maintaining the information (or monitoring the hardware resource) may be performed by one or more hardware elements or circuitry in the computer system/electronic device. In some embodiments, the hardware elements may be within the first processing unit, as desired. FIGS. 4A-4E provide further descriptions of hardware for monitoring/maintaining information regarding respective hardware resources of the first processing unit.

In some embodiments, maintaining the information may be performed over a first period of time. The time period may be measured in a number of clock cycles and/or a measure of seconds, among other units of time. In one embodiment, maintaining the information may include, during the first period of time, determining that a respective hardware strand has requested use of the respective hardware resource and adjusting a value in response to the determination. For example, adjusting the value in response to the determination may include decrementing or incrementing a counter each time the respective hardware resource is busy or in use during a request of the resource (e.g., by the respective hardware strand). Thus, as one example, a first strand may be executing a software thread that requires an execution unit that is in use. In response to the execution unit being in use, a counter corresponding to in use resource attempts may be incremented.

In some embodiments, maintaining the information may be performed over a first number of clock cycles and may include storing the first number in a register or other memory element. Additionally, a second number may be adjusted each clock cycle during which the respective hardware strand attempts or desires to use the respective hardware resource but cannot because the hardware resource is in use, and decrementing the first number in the register or memory element each clock cycle. More specific descriptions of such an embodiment are described below with respect to FIGS. 4A-4E.

As indicated above, in 306, the information of 304 may be compared to a threshold. In some embodiments, the threshold may simply be a specific number of times the hardware resource was busy when requested (e.g., by the strand). As a simple example, a memory resource may have been in use 10 times (e.g., as stored in a counter) over the first time period (e.g., 100 clock cycles). The threshold value may be 5. Correspondingly, in this example, the memory resource may have been saturated during the 100 clock cycles since it exceeded the threshold.

As indicated above, in 308, an interrupt may be generated if the information exceeds the threshold in 306. As indicated above, the interrupt may indicate that the respective hardware resource is currently saturated, and one or more actions may need to be performed.

In 310, one or more load-balancing operations may be performed in response to the interrupt. In some embodiments, the load-balancing operations may be performed by an operating system (or other operating software) executing on the computer system or electronic device comprising the plurality of processing units. However, other embodiments are envisioned where hardware may perform some or all of the load-balancing operations.

The one or more load-balancing operations may include moving a software thread to a different one of the processing units (e.g., one that is unsaturated in general, or unsaturated with respect to the specific hardware resource). In one embodiment, this may be done simply by moving one or more software threads that are executing on strands of the first processing unit to a different processing unit of the system (e.g., a computing system comprising the first processing unit).

In some embodiments, this may be performed intelligently where a software thread that is causing saturation of the hardware resource may be moved to a different processing unit. Additionally, or alternatively, relative amounts of hardware resource usage may be monitored and used for thread load-balancing. For example, where a first hardware resource is indicated as being saturated (e.g., via the interrupt of 308) and a second hardware resource is not indicated as being saturated, load-balancing may be performed according to threads that require the first hardware resource more than the second hardware resource (or vice versa). As a more specific example, a first software thread may be particularly memory intensive while a second software thread may utilize a floating point unit hardware resource. In such cases, the first software thread may be moved from a processing unit in which the memory resource(s) are saturated. Similarly, the second software thread may be moved from a processing unit in which the FPU is saturated. Thus, software threads may be distributed among a plurality of processing units according to hardware resource saturation or underutilization (e.g., as indicated, for example, by the absence of an interrupt). As also indicated, particular threads may be moved to other processing units if they are responsible for the saturation of a particular hardware resource of a processing unit. It should be noted that the decision to make the load-balancing operations (e.g., by the operating system) may take into account the cost of the load balancing operations (e.g., moving a software thread from one core to another in the case of a context switch).

In some embodiments, other activities may be performed based on the interrupt/indication of saturation. For example, an operating system (or other software) may maintain moving averages of the utilization of various hardware resources, strands, processing units, etc. as a guide for when to revise software-to-hardware thread mappings. Note that other activities are envisioned.

In one specific example, SPECjbb2005 (a Java™ benchmark) may be executed on a processor having a plurality of cores each with a plurality of strands. In this benchmark, the software threads may be memory intensive or not at various times. Using one of the above described load-balancing methods, situations where many memory intensive threads that are executing on a single processing unit (thereby saturating shared memory resources) may be avoided by redistributed the software threads for a more optimal performance.

The method may further include (or the load balancing operations may include) modifying one or more parameters of maintaining the information. For example, the specific hardware resource being monitored may be modified, the length of time (e.g., the cycles or seconds, among other units) may be modified, the threshold value may be modified, and/or other parameters may be modified. In some embodiments, such modifications may be performed dynamically during operation or statically, as desired. The modifications may be performed by software (e.g., operating system software executing on the computer system comprising the plurality of processing units) or by hardware, as desired. After modification, the system may operate according to the methods described above using the modified parameters.

It should be noted that the one or more parameters may be set or modified based on specific hardware implementations. Similarly, load-balancing operations (or choices made thereof) may also depend on the hardware in use (e.g., the type of processing unit(s)). For example, in processing units with more per-hardware-thread resources, a larger context switch cost may exist, and load balancing operations should take into account that cost. Conversely, processing units with smaller, for example, level 1 caches, may have a lower context switch cost. Thus, one or more of the methods/parameters described herein may vary based on the hardware implementation/the hardware being monitored.

FIGS. 4A-4E

FIGS. 4A-4E are diagrams illustrating exemplary states of in a system operating according to an embodiment of the method of FIG. 3.

Figure 4A:
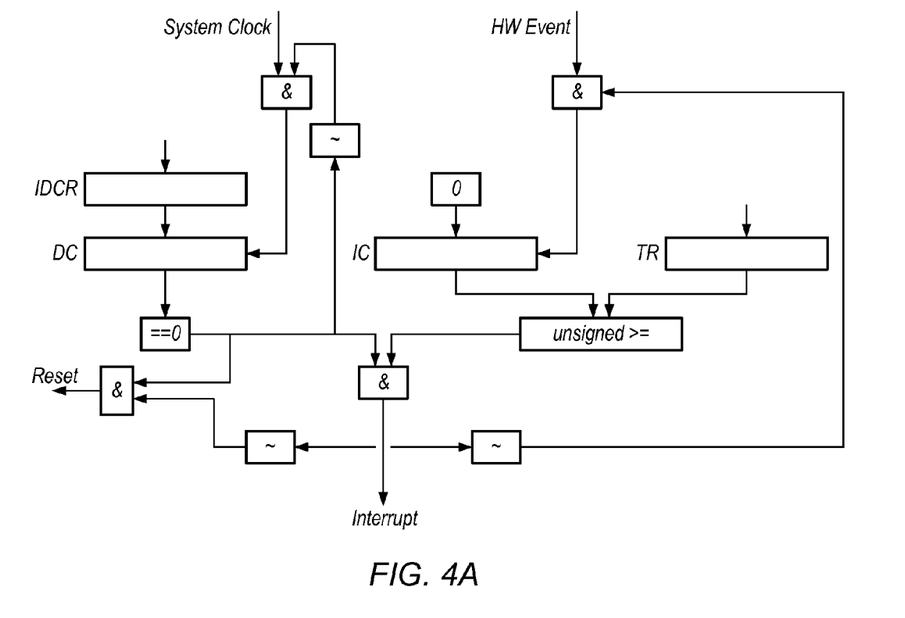
FIGS. 4A-4E are diagrams illustrating exemplary states of in a system operating according to the method of FIG. 3, according to one embodiment.

FIG. 4A illustrates an operational diagram of the various registers and counters before any values are used. As shown, a system clock may be used for the decrementing counter DC, and an incoming hardware event may be used for the incrementing counter IC, which may be compared to a threshold value stored in TR. Note that the DC may latch at 0, i.e., it may not keep counting down after it reaches 0 (as indicated by the ==0 feedback on the diagram, which may be implemented by inverse gating the control line that causes the DC to decrement). Note that the feedback loop to the IC control line may cause the value in IC to latch when the expression (IC>=TR) && (DC==0) is true. It may not be possible for IC to wrap around, since the number of times that "HW Event" can occur may always be less than or equal to any possible value for IDCR. In the embodiment shown in FIGS. 4A-4E the bit width of IDCR, DC, IC and TR may all be the same.

The initial value for the decrementing counter DC may be stored in IDCR. Additionally, the illustrated diagram may assume active high for control inputs. For example, a value of '1' on the control inputs to DC and IC may cause them to decrement and increment respectively. These values and events may be used to determine whether or not an interrupt is generated, as indicated above in FIG. 3.

Figure 4B:
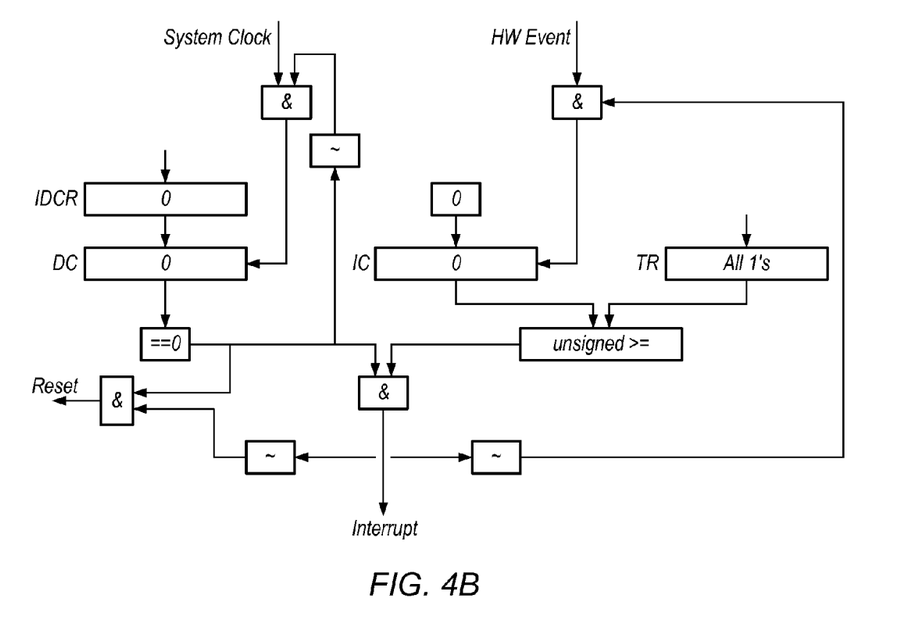

FIG. 4B illustrates an exemplary hardware reset state, which may be the state that the hardware initializes to. Effectively, the state machine may continuously reset itself in this state. Unless software intervenes by loading alternate values into IDCR and TR, the "Reset" line may be always asserted in this state.

Figure 4C:
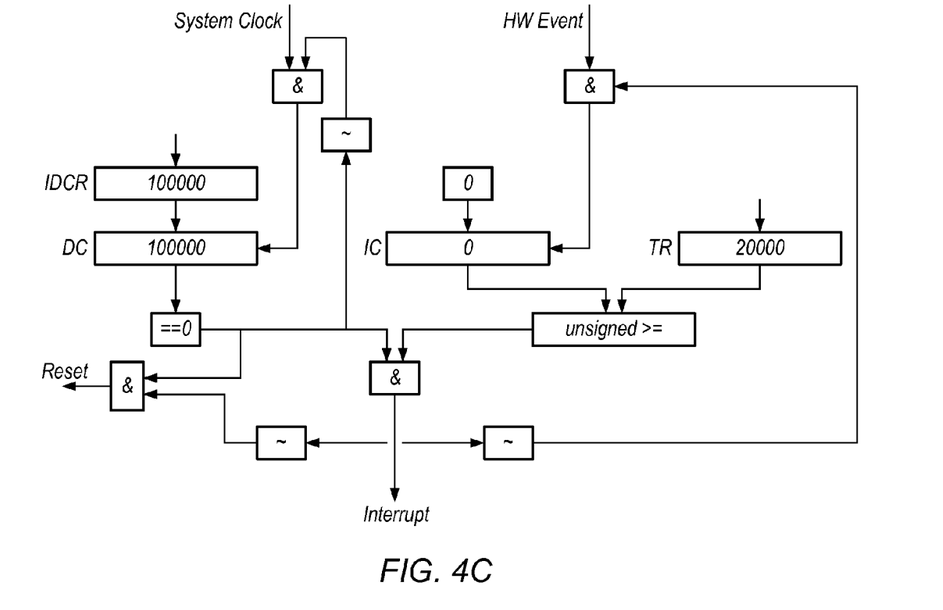
Figure 4D:
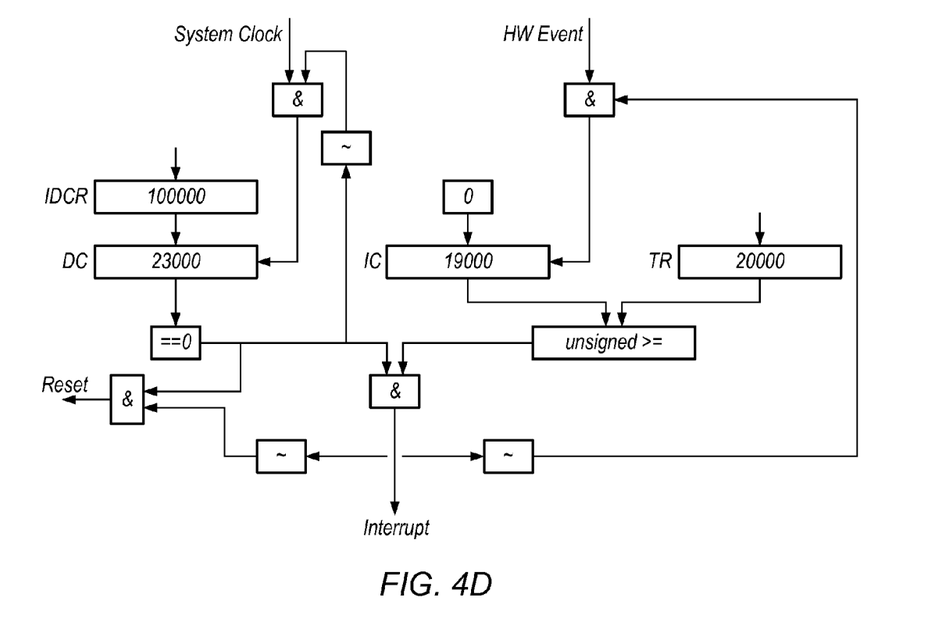
Figure 4E:
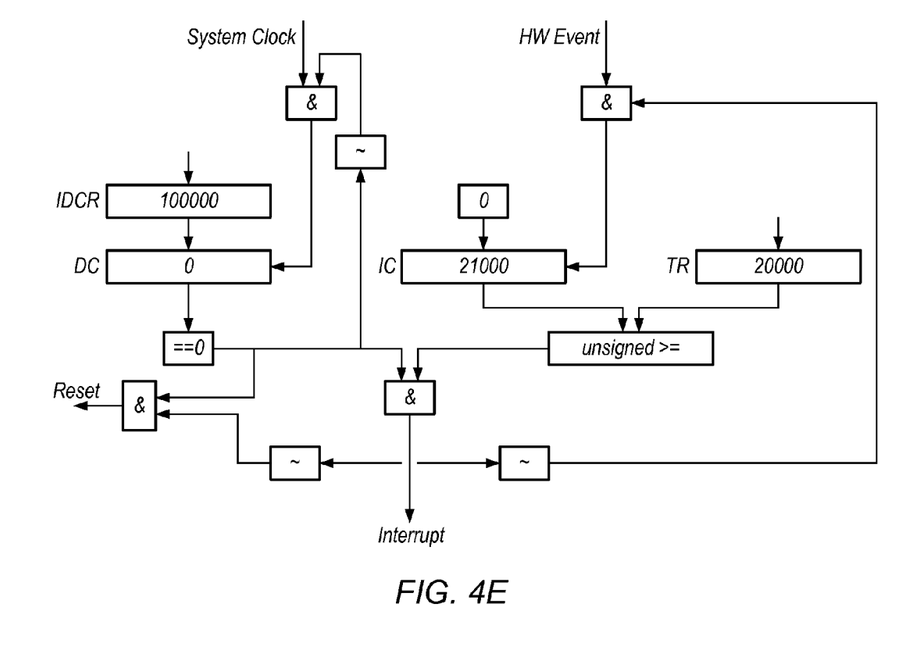

FIG. 4C illustrates an initial state which may be loaded by some external agent where IDCR is 100000, DC is 100000, IC is 0, and TR is 20000. In FIG. 4D, the respective hardware resource has been busy 19000 times over the period of 77000 clock cycles (as indicated by the DC value of 23000). In FIG. 4E, the value of DC is 0 (indicating the first time period has expired, which in this case, is 100000 clock cycles), and the IC is 21000 indicating that the hardware resource has been busy when requested 21000 clock cycles in the 100000 clock cycles. Correspondingly, the value in IC is compared to the threshold 20000 and an interrupt is generated and sent to the operating system since DC is also 0. Additionally, the values may be reset to the initial values of FIG. 4C via reset state 4B.

In an alternate embodiment, the "Reset" and its inputs may be eliminated. Correspondingly, the IC may then just keep counting until "Interrupt" is triggered, which would in turn stop IC from incrementing further. For this implementation the "unsigned >=" may be modified to be "unsigned >" in order to prevent an interrupt from being triggered from the reset state.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for load-balancing threads among a plurality of processor cores, comprising:

a first processor core executing a plurality of software threads using a respective plurality of hardware strands, wherein the plurality of hardware strands share at least one hardware resource, wherein each of the at least one hardware resource is a component within the first processor core;

monitoring the at least one hardware resource, wherein, for each respective hardware strand, said monitoring comprises:

for each respective hardware resource of the at least one hardware resource:

maintaining information for a first number of clock cycles, wherein the first number of clock cycles is a length of time for monitoring the respective hardware resource, wherein said maintaining information comprises:

storing the first number in a register;

decrementing the first number on each clock cycle until the first number equals zero;

during said decrementing:

incrementing a second number if the respective hardware resource was in use when the respective hardware strand requested use of the respective hardware, wherein the second number is a number of times that the respective hardware resource was in use when the respective hardware strand requested use of the respective hardware resource;

comparing the second number to a threshold; and         generating an interrupt if the second number exceeds the threshold; and     performing one or more load-balancing operations in response to the interrupt, wherein said performing the one or more load-balancing operations comprises moving a software thread associated with the respective strand to a different one of the plurality of processor cores.

2. The method of claim 1, wherein the at least one hardware resource comprises one or more of:

one or more memory elements;

one or more integer units;

one or more floating point units; or one or more program execution units.

3. The method of claim 1, wherein the second number comprises a number of clock cycles during which the respective hardware thread desires to use the respective hardware resource but cannot because the respective hardware resource is in use.

4. The method of claim 1, wherein said maintaining is performed for a first period of time and wherein the method further comprises modifying the first period of time.

5. The method of claim 1, further comprising:
modifying the threshold.

6. The method of claim 1, wherein said performing is performed by an operating system utilizing the plurality of processor cores.

7. The method of claim 1,
wherein the interrupt indicates that the respective hardware resource is saturated.

8. A computer system which load-balances threads, the system comprising:
a plurality of processor cores, wherein a first processor core of the plurality of processor cores comprises:
at least one hardware resource;
a plurality of hardware strands, wherein the plurality of hardware strands share the at least one hardware resource within the first processor core;
wherein the plurality of hardware strands are configured to execute a plurality of software threads;
a first circuitry for monitoring the at least one hardware resource, wherein the first circuitry is configured to, for a first number of clock cycles, monitor a respective hardware strand requesting to use the respective hardware resource but failing to do so because the respective hardware resource is in use, wherein the first number of clock cycles is a length of time for monitoring the respective hardware resource;
a memory element coupled to the first circuitry for maintaining information regarding said monitoring, wherein said maintaining information comprises:
storing the first number in a register of the memory element;
decrementing the first number on each clock cycle until the first number equals zero;
during said decrementing:
incrementing a second number if the respective hardware resource was in use when the respective hardware strand requested use of the respective hardware resource, wherein the second number is a number of times that the respective hardware resource was in use when the respective hardware strand requested use of the respective hardware resource;
comparing the second number to a threshold, thereby determining if the at least one hardware resource is saturated; and wherein the first circuitry is configured to generate an interrupt if the information regarding said monitoring indicates saturation of the at least one hardware resource; and
wherein one or more load balancing operations are performed in response to the interrupt, wherein said performing the one or more load-balancing operations comprises moving a software thread associated with the respective strand to a different one of the plurality of processor cores.

9. A method for load-balancing threads among a plurality of processor cores, comprising:
a first processor core executing a plurality of software threads using a respective plurality of hardware strands, wherein the plurality of hardware strands share at least one hardware resource within the first processor core;
monitoring the at least one hardware resource, wherein, for each respective hardware strand, said monitoring comprises:
maintaining information for a first number of clock cycles, wherein the first number of clock cycles is a length of time for monitoring the respective hardware resource, wherein said maintaining information comprises:
storing the first number in a register;
decrementing the first number on each clock cycle until the first number equals zero;
during said decrementing:
incrementing a second number if the respective hardware resource was in use when the respective hardware strand requested use of the respective hardware;
comparing the second number to a threshold, thereby determining if the at least one hardware resource is saturated, wherein the second number is a number of times that the respective hardware resource was in use when the respective hardware strand requested use of the respective hardware resource; and
generating an interrupt if the information indicates saturation of the at least one hardware resource; and
performing one or more load-balancing operations in response to the interrupt, wherein said performing the one or more load-balancing operations comprises moving a software thread associated with the respective strand to a different one of the plurality of processor cores.

* * * * *